United States Patent [19]

Gelb et al.

[11] Patent Number: 5,018,060
[45] Date of Patent: May 21, 1991

[54] ALLOCATING DATA STORAGE SPACE OF PERIPHERAL DATA STORAGE DEVICES USING IMPLIED ALLOCATION BASED ON USER PARAMETERS

[75] Inventors: Jack P. Gelb; John C. Tyrrell, both of San Jose, Calif.

[73] Assignee: IBM Corporation, Armonk, N.Y.

[21] Appl. No.: 301,970

[22] Filed: Jan. 26, 1989

[51] Int. Cl.[5] .................. G06F 13/00; G06F 12/00
[52] U.S. Cl. .................................. 364/200; 364/970; 364/970.2; 364/968; 364/967; 364/967.2; 364/964.6; 364/253; 364/253.2; 364/253.1; 364/243; 364/245.8; 364/245.5
[58] Field of Search ... 364/200 MS File, 900 MS File

[56] References Cited

U.S. PATENT DOCUMENTS

| | | | |
|---|---|---|---|
| 4,024,507 | 5/1977 | Berkling | 364/200 |
| 4,121,286 | 10/1978 | Venton | 364/200 |
| 4,310,883 | 1/1982 | Clifton | 364/200 |
| 4,313,161 | 1/1982 | Hardin | 364/200 |
| 4,429,363 | 1/1984 | Duke | 364/200 |
| 4,463,424 | 7/1984 | Mattson | 364/200 |
| 4,466,059 | 8/1984 | Bastian | 364/200 |
| 4,574,346 | 3/1986 | Hartung | 364/200 |
| 4,653,021 | 3/1987 | Takagi | 364/900 |
| 4,660,130 | 4/1987 | Bartley | 364/200 |
| 4,727,487 | 2/1988 | Masui et al. | 364/300 |
| 4,769,782 | 9/1988 | Iwanaga | 364/900 |
| 4,771,375 | 9/1988 | Belgin | 364/200 |
| 4,805,093 | 2/1989 | Ward | 364/200 |

OTHER PUBLICATIONS

Garbage Collection in a Large Lisp System, David A. Moon 1984, ACM. pp. 235-246.

Garbage Collection in a Very Large Address Space, by Peter B. Bishop, MIT, Cambridge, Mass. 1975.
Generation Scavenging: A Non-Disruptive High Performance Storage Reclamation Algorithm, 1984 ACM, by David Ungar, pp. 157-167.

*Primary Examiner*—Thomas C. Lee
*Assistant Examiner*—Eric Coleman
*Attorney, Agent, or Firm*—Herb Somermeyer

[57] ABSTRACT

Units of data (data sets, data bases, etc.) are allocated data storage space in a data storage system based on implicit analysis of the unit of data. A plurality of data classes, each defining predetermined characterisitics of diverse units of data, are established for the data storage system. A plurality of storage classes, each defining predetermined sets of storage performance and availability requirements are established for the data storage system. A plurality of management classes, each defining respective diverse sets of life cycle attributes for units of data are established for the data storage system. A plurality of storage groups, each defining diverse predetermined performance device and management available in the data storage system but independently of the individual storage devices of the data storage system are established. The devices are selectively assigned to different ones of the established storage groups. Each received spaced allocation requested has its parameters (source, type of data, etc.) matched with the data, storage and management classes for assignment of one each of those classes to the unit of data related to the allocation request. A storage group is also assigned. The matching of the different classes and group are independent of one another. Allocation is based upon the resulting class and group selection.

10 Claims, 3 Drawing Sheets

ALLOCATING DATA STORAGE SPACE OF PERIPHERAL DATA STORAGE DEVICES USING IMPLIED ALLOCATION BASED ON USER PARAMETERS

FIELD OF THE INVENTION

This invention relates to computer-controlled peripheral data storage and more particularly to the global management of data storage for provided transparent isolation of the peripheral data storage characteristics from application programs using the peripheral data storage.

BACKGROUND OF THE INVENTION

Storing computerized data (coded or uncoded—uncoded is also termed image, graphics or raster data) in peripheral devices and subsystems has become an important cost consideration in modern day information processing systems. Further, the immensity of the storage capacity available in information processing systems has reached staggering levels. The current way of managing the peripheral storage of data is fast becoming unsatisfactory because of the costs involved and difficulty in managing the data storage space, providing performance (rapid access to data storage spaces or areas) as well as placing the burden on application programmers to effectively utilize such immense peripheral data storage capacity. It is desired to insulate the application programmers from the current requirement that their respective programs must have some information about the physical parameters of the peripheral data storage. It is desired to provide a completely logical control wherein the application programmers need only concern their programming with data sets, data bases, and the like as such items best serve the application program. Such data set considerations can include a broad indication of desired performance, indications of size, need for availability and reliability levels, and the like. All factors concerning space management, performance management, availability management and device install management of the peripheral subsystems should not be noticeable to the user programmer involved with application programs. To date, this has not been the situation.

DISCUSSION OF THE PRIOR ART

Initially job control language (JCL) required the computer user to specify many parameters of program execution including specifications of peripheral data storage. Then each time the peripheral data storage was changed, a corresponding change was required in the JCL statements for the programs to be executed. An example of JCL control of a data processor is shown by Poublan et al in U.S. Pat. No. 4,104,718. It is this interaction between operation of the peripheral data storage and the user application programs that is to be minimized, if not eliminated.

It is desired to let the user or application programmer issue specifications, preferably implicitly, of program execution and data storage requirements which are at a relatively high or logical level. The term "logical" herein refers to the specifications for desired program execution, particularly for peripheral data storage. It is desired that all allocation and controls of the peripheral data storage be removed from direct intervention by the application programmer.

The term "logical" has been used for years to describe program denominated units, such as "logical devices". Such logical descriptions did not remove the interaction of the application programmer with peripheral data storage. An example of such logical device specifications is found in the Christian et al patent U.S. Pat. No. 4,403,288 wherein one physical device (DASD—direct access storage device) was addressable as four logical devices. The proliferation of DASD in peripheral data storage subsystems resulted in a centralized DASD storage space allocation program called DADSM (direct access device space management). Still the application programmer had to request space in terms of device parameters and types. See the article by Duvall et al, "Asynchronous Allocation Requests", IBM TECHNICAL DISCLOSURE BULLETIN, Vol. 25 No. 8; January 1983, pp 4148-4150. It is desired to remove device parameter specifications from the application programmer; let the application programmer only be concerned with high or logical levels of specification independent of device parameters. This desire requires implicit translation of the logical parameter specification into data storage device selections and space allocation on selected devices.

March in the article "Data Base Control and Processing System", IBM TECHNICAL DISCLOSURE BULLETIN, Vol. 25, No. 7A, December 1982, pp 357814 3582 illustrates some of the complexity involved with data base management. It is desired to remove the complexity from adversely affecting application programmer efforts.

White in U.S. Pat. No. 4,467,421 describes a virtual data storage system which employs a memory control processor external to a host processor which divides user-defined data sets into blocks of a size convenient for storage in peripheral data storage devices. The memory processor assigns such blocks to storage locations on peripheral data storage devices. This memory processor intercepts the device oriented input-output commands from the host processor and adjusts operation of the peripheral data storage subsystem to make it more efficient. From this brief description, it is readily seen that the application programmer still is required to have JCL statements that are device dependent even if an external memory processor interprets the device dependencies differently than intended by the application programming. While this arrangement may ease the effects of changing device types and the like, it still seems to saddle the application programmer with device parameter considerations. It is desired to avoid the continuance of such a requirement.

Hartung in U.S. Pat. No. 4,638,425 shows a cached-DASD data storage subsystem in which the application programmer may insert a storage parameter indication of whether certain data records can be stored primarily in volatile (cache) peripheral storage or is primarily retentively stored (DASD) in the peripheral subsystem. When primarily stored in the cache, performance is enhanced but the application program is responsible for any lost data due to power problems or equipment failures. The selection is based on "use" status, i.e. is the use interactive with terminals (to be cached for performance) or is the use post-terminal activity (to be primarily retentively stored). While the use indication appears logical, it is seen that the application programmer has to understand important operational characteristics of the peripheral data storage subsystem. It is desired to make such determinations implicit rather than explicit.

Hill in U.S. Pat. No. 4,607,346 shows an implicit control of a peripheral DASD based upon the user or application programmer specifying "access densities" for a given program. Based upon such specified access densities, the data to be stored is directed to different portions of a DASD. From this description, it is seen that the application programmer is still involved with device parameters, but that the device parameter designations are complicated with desired access parameters of the application program. It is desired to avoid such additional complexities.

Beglin et al in U.S. Pat. No. 4,638,424 describes a machine implemented management of peripheral data storage. The patent refers to the IBM product Hierarchical Storage Manager, now termed Data Facility Hierarchical Storage Manager. The patent teaches machine managed priority of access and allocation to a large plurality of peripheral data storage devices for the purposes of migration, recall, backup, recovery and defragmentation of the data sets stored in peripheral data storage. The patent is concerned with resolution of contentions for devices by attached host processors. The machine effected activities described in this patent occur after it has been determined to migrate or backup operating data sets which have already been stored in peripheral data storage devices, such as DASD. Therefore, this patent does not address the problems of isolating the application programmer from peripheral data storage complexities.

Kitajima et al in U.S. Pat. No. 4,542,458 teach allocating data to devices based upon failure rates of the devices. Such allocation certainly seems to continue the interaction of the application programmer with device parameters.

Kamionka et al in U.S. Pat. No. 4,528,624 teach selecting peripheral devices for allocations preparatory to peripheral data storage based upon maximal free storage space in the devices. This selection is independent of the actual storage capacity of the various devices. This simple but effective selection process is machine executed after the application programmer has completed the device related JCL statements; i.e. the machine operations for data space allocations do not alleviate all of the interactions between the application programmer and device characteristics.

Crabtree et al in U.S. Pat. No. 4,604,690 disclose an on-line method of reconfiguring a data processing system for added I/O or peripheral devices. This patent teaches that a control block defining a newly added peripheral device can be added and stored in main memory of a host processor so its use can start while the host processor is operating (no system generation is required).

Setting up and attaching devices in real time does nothing to ease the above described interaction requirements previously found in data processing environments.

Kimura et al in U.S. Pat. No. 4,704,695 show an inference system wherein attributive information is supplemented to a knowledge unit for the purpose of smooth execution of the inference. While this patent shows adjusting operations based on later inputs (learning engine), it does not suggest how to resolve the problems set forth above.

Clifton et al in U.S. Pat. No. 4,310,883 teach an allocation scheme for a tape library system, such as for the IBM 3850 Mass Storage System. This allocation process requires that the application programmer have an awareness of the tape library system—therefore does not eliminate the above referred to interaction that is to be eliminated. The patent does teach the concept of a group of storage volumes (virtual volumes in the tape library) which are scanned for finding a best suitable storage volume for storing a data set to be stored. Risk factors of the allocation succeeding or failing are a prime aspect of this teaching. Therefore, storage groups can be employed while still keeping the undesired interaction between application programmer and the peripheral data storage systems.

SUMMARY OF THE INVENTION

In accordance with the present invention, a plurality of data related classes are defined. Such classes are defined independent of each other. The classes are set up so as to enable a host processor to respond to data set parameters to implicitly select data storage units which can achieve the desired system operations for satisfying the data set parameters. The data set parameters are preferably implicitly derived from data set naming which are governed by data set naming conventions and standards explicitly unrelated to peripheral data storage parameters.

In a machine-effected method of the invention, the data related classes include data classes which are based upon predetermined data set parameters for diverse types of data sets to be stored and retrieved from peripheral data storage, storage classes which include classification by predetermined performance and availability parameters for data sets which are to be members of various ones of the storage classes, storage group(s), which define the collections of peripheral data storage devices as to status, capacity, connectability etc, and management classes which respectively define the life cycle characteristics of the various data sets. The information from a storage class is used for selecting data storing volumes within one of the storage group(s) independently of any application program JCL statements. Also, the available free space in the data storing volumes and their respective current levels of activity are factors in the selection of the storage group volumes.

The class selections for a given data set are preferably determined based upon a data set naming convention, such as a convention which includes identification of the business function which generated the data set, its size, allocation attributes, security criteria, and other related job information and needs. A data storing volume is directly or indirectly associable with a physical device; the selection of a data storing volume implies a selection of a device. Each physical device may have one or more data storing volumes, one data storing volume may be dispersed over a plurality of devices, logical devices may be used in addressing the physical device, and the like.

The classes and groups are first defined using interactive means by a so-called Storage Administrator. The defined classes and groups are assembled into control tables used to implicitly select data devices based on logical level specifications about the data set to receive an allocation of peripheral data storage space. In a preferred sequence of machine effected device selection, the data class is first selected, then a storage class is selected followed by selection of a management class. The selection of the three classes are then combined to select a storage group which best fits the parameters set forth in the three selected classes. The selection of classes for any data set or data base depends not only on the class definitions, but also on the logic used in the automatic class selection processing. In all cases, the Storage Administrator (usually a person) has total control over the volume and class selection criteria; the application programmer need not be concerned with such definitions. Once a storage group has been selected, allocation of data storing space of a volume which is a member of the storage group may proceed asynchronously with respect to automatic class selection.

The foregoing and other objects, features, and advantages of the invention will be apparent from the following more particular description of the preferred embodiments of the invention, as illustrated in the accompanying drawings.

DETAILED DESCRIPTION

Figure 1:
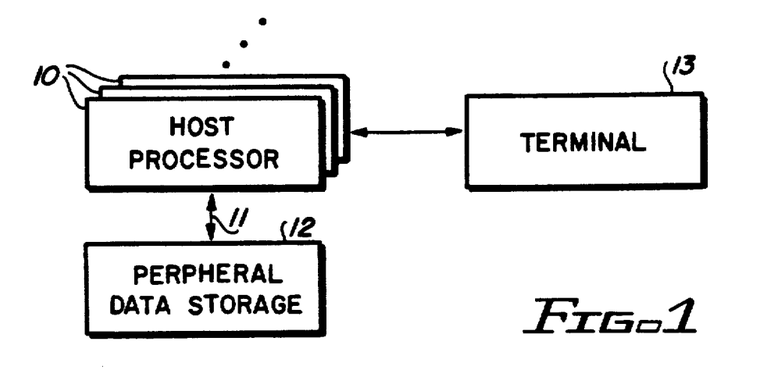
FIG. 1 shows a plurality of host processors sharing a peripheral data storage system in which the present invention is advantageously practiced.

Referring now more particularly to the appended drawings, like numerals indicate like features and operations in the various figures. FIG. 1 shows a data processing system having a plurality of host processors 10 sharing a peripheral data storage system 12 via a plurality of input-output connections (such as I/O channels) 11. The present invention makes the data processing system easier to use by application programmers.

Figure 2:
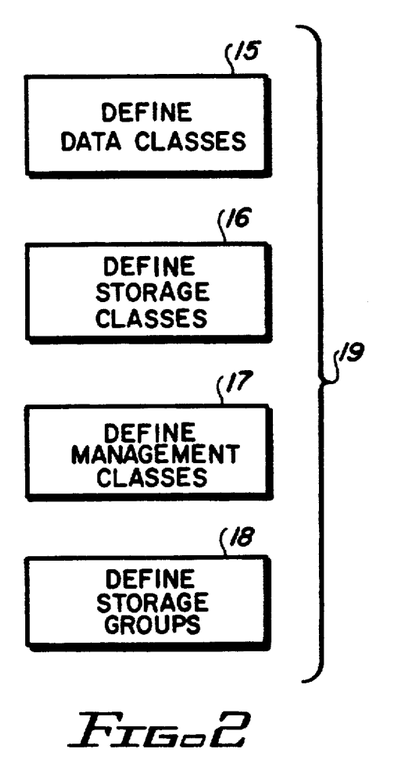
FIG. 2 shows a simplified random executing set of machine operations involving interaction with a human being for establishing classes and groups usable for practicing the present invention in the FIG. 1 illustrated system.

FIG. 2 illustrates the preparatory steps for implementing the present invention in the FIG. 1 illustrated data processing system. A machine-human interactive program enables interactive steps 15-18 to generate data structures for insulating the application programmers from the characteristics of data storage system 12. The steps 15-18 can be an on-going time spaced interactive operation, as schematically indicated by bracket 19, to keep tuning the operation of the data processing system.

The interactive relationship between a host processor 10 and an operator (Storage Administrator) includes terminal 13 and a terminal support program in such host processor 10. A preferred interactive system in setting up the classes and groups is the IBM Interactive System Management Facility (ISMF) which is a part of the IBM Data Facility Product (DFP). ISMF enables the steps illustrated in FIGS. 2 and 3 to be easily performed. In view of the plethora of interactive programs readily available, the internal details of such programs are not repeated here. The description herein discloses to one of ordinary skill how to implement the present invention. ISMF is menu driven having the following menu set up for establishing, inter alia, the classes, storage groups and ACS routines of the illustrated embodiment.

| ISMF MENU | | |
|---|---|---|
| 0 | ISMF PROFILE | change profile |
| 1 | DATA SET APPLICATION | data set functions |
| 2 | VOLUME APPLICATION | volume functions |
| 3 | MANAGEMENT CLASS | set up/alter management classes |
| 4 | DATA CLASS | set up/alter data classes |
| 5 | STORAGE CLASS | set up/alter storage classes |
| 6 | STORAGE GROUP | set up/alter storage groups |
| 7 | ACS APPLICATION | automatic class selection functions |
| 8 | CDS | control data set functions |
| S | DFSORT | sort/copy/merge functions |
| X | EXIT | |

The words selected above differ slightly from that used in ISMF.

Step 15 provides for interactive definition of data classes. Such interactive definition is achieved by using ISMF selection number 4. A data class specifies data set logical attributes, such as data set type, record length, data storage space requirements in terms of logical bytes not in terms of physical storage space requirements, expiration and retention dates for the data set and any Virtual Storage Access Method (VSAM) data set options. Just the data class by itself will simplify data set allocation (eg JCL DD statements are simplified), help introduce allocations standards and can be used with later defined classes in accordance with the present invention or can be used independently with increased isolation of the application programmer from the peripheral data storage system, as will become apparent.

A suitable set of data classes, defined using ISMF, for first installing an embodiment of the invention is shown in the table below:

| TABLE OF DATA CLASSES | | | | | | |
|---|---|---|---|---|---|---|
| CLASS | RECFM | LRECL | AVGREC | AVGVAL | PSPACE | DIR SSPACE |
| DATAF | FB | 80 | U | 80 | 5K 5K | 0 |
| DATAV | VB | 255 | U | 255 | 5K 5K | 0 |
| SRCFLIB | FB | 80 | U | 80 | 5K | 62 |

-continued

TABLE OF DATA CLASSES

| CLASS | RECFM | LRECL | AVGREC | AVGVAL | PSPACE | SSPACE | DIR |
|---|---|---|---|---|---|---|---|
| SRCVLIB | VB | 255 | U | 255 | 5K | 5K | 62 |
| LOADLIB | U | NA | U | 23476 | 50 | 50 | 62 |
| LISTING | VBA | 137 | U | 137 | 20K | 20K | 0 |
| ENTRY | ES | NA | U | 4K | 100 | 100 | 0 |
| KEYED | KS | 0 | U | 4K | 100 | 100 | 0 |
| DIRECT | RR |  | U | 4K | 100 | 100 | 0 |
| LINEAR | LS |  | U | 4K | 100 | 100 | 0 |

In the table above the acronyms are:

Data class names; DATAF—sequential fixed length record; DATAV—sequential variable length records; SRCFLIB—partitioned fixed length record source; SRCVLIB—partitioned variable length record source; LOADLIB—partitioned load module library; LISTING—sequential SYSOUT listing (SYSOUT is system output); ENTRY—VSAM entry sequenced; KEYED—VSAM key sequenced; DIRECT—VSAM relative record and LINEAR—VSAM linear data set.

The column headings; RECFM—record format; LRECL—logical record length; AVGREC—scale factor for data storing space (i.e. megabyte (MB), kilobyte (KB) or other units of space); AVG Value —average value of the record length; PSPACE—primary space required; SPACE—secondary space required and DIR—size of a directory for the data set.

Acronyms in the columns; FB—fixed block; VB—variably sized block; U—undefined records (multiply by 1); VBA—variable blocked with ASA characters; ES—entry sequenced; KS—key sequenced: RR—relative record; and LS—linear record.

From inspection of the table above, it is seen that data set parameters are defined in the data classes for characterizing the data of the various data sets to be stored. In other words, a data class sets forth how a data set looks to a data processor.

A defined data class applies to data sets being stored on both system managed and non-system managed data storing volumes. The term non-system managed volumes indicates those volumes not selected or otherwise controlled via the system in which the present invention may be incorporated. Data sets assigned to any data class are storable in data storage system 12 either as system managed or non-system managed data sets.

Step 16, invoked by selecting 5 on the above ISMF menu, interactively defines storage classes using the facilities and procedures referred to for step 15. Each storage class sets forth its own set of storage services in device independent terms. Such services include random access specifications, sequential access specifications, guaranteed space (i.e. pre-allocation of data storage space before any attempted storage of data in the peripheral data storage system), etc. From the above listed terms, it is seen that the requirements are separate from device capabilities. Once a data set is assigned to a storage class, then the present invention is used in managing the data set; for convenience such a data set is termed a "system managed data set". The format of the class definition is arbitrary and not shown here. The paragraph below lists a series of storage classes suitable for practicing the present invention.

A brief description of some exemplary storage classes and their service attributes follows. Storage class DBLOG is for data base logs. It has direct access specification of a bias to reading with a response time of five milliseconds. Sequential specifications are a bias to recording or writing data sets to the data storage system 12 with a response time of three milliseconds. Guaranteed space is required for data sets in this class. The storage class DBBASE is for so-called standard or usual performance data bases. The only specification here is guaranteed space. The storage class DBENHANC for enhanced performance data bases have data sets with a direct access specification of reading in ten milliseconds and a sequential access read access time of ten milliseconds. Guaranteed space is provided for data sets in this storage class. The storage class DBCRIT for high availability data bases has a direct access read specification for ten milliseconds, a sequential read access specification of ten milliseconds, continuous availability of the data to the host processors 10 and an entitlement to guaranteed space. The storage class DBFAST for high performance data bases has direct access read response time of five milliseconds, a sequential read response time of five milliseconds and guaranteed space for member data sets. The storage class BASE includes standard performance services as may be provided by data storage system 12. The storage class ENHANCED is a set of enhance performance storage services. A direct and sequential access response time of ten milliseconds is provided for all accesses (read and write). The storage class CRITICAL has the services of continuous availability with direct and sequential access responses of ten milliseconds for all types of accesses. The storage class FASTREAD describes storage services for high read performance. The specifications are for an access response time of five milliseconds for all read accesses in both the direct and sequential modes. The last described storage class is FASTWRIT for high write performance services. A write or recording storage access of five milliseconds is provided in the direct access mode and three milliseconds in the sequential mode.

Executing step 17, invoked by selecting 3 on the ISMF menu above, generates definitions for management classes. Each management class relates to life cycle controls for a data set. Each specifies space, availability and retention management requirements. These specifications include migration from a high or rapid access level of a data storage hierarchy to lower levels or slower accesses, expiration and retention dates and limits, backup frequency (zero means no backup), retention of backup copies, generation data group (GDG) and set processing options (each GDG is a version of data, each time a data set is updated it is a candidate to become a new version of that data—i.e. a next generation of the data) and partial release options. Partial release means an unused portion of the data storage may be released, i.e. returned to a free or available space list for the volume. The description below describes a set of management classes defined via ISMF and which are suitable for practicing the present invention.

All management classes have the following default properties which may be overridden by specifying different values in any of the management classes: no limit on data set expiration dates, no partial releases, the number of primary (storage level zero) days of non-usage is limited to two (migration or other activity removes such inactive data set from the primary storage volume) and the number of level one residency of non-usage at any lower level is sixty days (level one is the next lower level from level zero of the peripheral data storage hierarchy). The primary or level zero contains the peripheral data storage devices with which the host processors 10 do their respective day to day peripheral operations. The default parameters allow both automatic and commanded migration to different levels of the peripheral data storage hierarchy, backup frequency is unity, the number of backup versions is two, the backup copies are retained for sixty days and extra backup copies are retained thirty days, either the storage Administrator or a user can command a backup and automatic backup is active. Examples of management classes are set forth in the paragraph below.

The management class INTERIM—named as "MGMTCLAS(INTERIM)"-defines short life data sets. This management class indicates data set expiration after seven days of non-usage, has one generation data group on primary storage (level 1), if the data set is rolled off by generation data set action causes the data set to expire, partial releases are permitted and their is no automatic backup.

MGMTCLAS(DBSTNDRD) is for non-migratory data bases. There is no commanded nor automatic migration and no automatic backup. MGMT(DBMIG) is for migratable data bases. The number of days of non-usage in the primary storage level (level zero) is fifteen at which time the data base is automatically migrated to a lower level in the data storage hierarchy, usually level one. There is no automatic backup. MGMTCLAS(STANDARD) is for data sets which use standard processing. Partial release of such data sets is permitted, the number of days of non-usage in level zero before migration to a lower storage level is fifteen, backup frequency is zero and automatic backup is enabled. MGMTCLAS(GDG) describes generation data groups. In this class partial releases are permitted, the number of primary days residence and non-usage in level zero before migration to level one is fifteen, while the number of level 1 days of residence without usage is limited to thirty before migration to a lower level of the data storage hierarchy, one GDG element can be stored in the primary or level zero data storage units, the elements are rolled off when they expire and there is no automatic backup. MGMT(LATEMIG) describes late migration. In this management class partial release is permitted and the number of days of non-usage on the primary before migration is thirty-five. MGMTCLAS(NOMIG) describes non-migratory data sets which will have no commanded nor automatic migration and a backup frequency of zero. MGMTCLAS(EXTRABAK) describes data sets which are to have extra backup versions. In this class partial release is permitted, the backup frequency is zero, five backup versions are permitted and the number of days resident on the primary storage is fifteen. MGMTCLAS(NOACTION) describes data sets that are to have no migration nor backup processing by the system management. There is no commanded nor migration and no automatic backup.

Execution step 18, started by selecting 6 on the ISMF menu above, generates a definition for a storage group. Each storage group identifies a group of data storage volumes, much like a volume pool; each such group can be similar to the storage groups described by Clifton et al, supra. Each storage group has its own volume management requirements such as space allocation thresholds (xx,yy) wherein xx is a high threshold value—if the volume fills to this threshold, then the data processing system initiates a migration of data from the primary or level zero volume until the xx is no longer exceeded. Such migration is known and can be effected by the IBM program product DFHSM. yy is a low threshold value at which threshold the above-mentioned migration to a data storing volume at a lower level of the data storage hierarchy stops. Such migration implicitly includes the operations of moving data sets from the volume, but also includes releasing the space once occupied by a migrated (moved) data set and deleting data sets in the volume that need not be migrated. The IBM program product DFHSM migrates, backs up and recovers data sets. A storage group is only selected for a data set to receive a peripheral storage allocation by program means; that is no storage group is selectable by a user or application programmer as provided for in Clifton et al.

The defined storage groups for a suitable set to practice the present invention are next defined, no limitation thereto intended. It is assumed that selection 6 of the above-indicated ISMF menu has been made. Four types of storage groups are defined, PRIMARY for non-database data sets, LARGE for large, non-data-base data sets, DATABASE for data base data sets and VIO for small temporary data sets. Unless otherwise selected, the defaults for all of the four storage groups are: automigration is enabled, automatic backup is enabled, no automatic dump is permitted, there are no migration thresholds set and a dump class is left blank.

The PRIMARY storage group is a pool of data sets. The PRIMARY storage group definition has a list of data storing volumes in the storage group, a list of systems, migration threshold is set at 90,80, automatic dump is enabled and dumping occurs on Sunday (Dump class =SUNDAY). The LARGE storage group also is a pool of data sets. The definition of the LARGE storage group lists storage volumes selectable for storing large data sets (this list has volumes different from the PRIMARY class volumes, no limitation thereto intended), indicates the system (may be the same system as indicated in other storage groups), automatic migration and backup are enabled, the migration threshold is set for 50,40, automatic dump is permitted in dump class SUNDAY. The storage group DATABASE (a pool type storage group) definition lists data storing volumes different from the lists in the storage groups PRIMARY and LARGE, no limitation thereto intended, it may indicate the same system, automatic migration is enabled while automatic backup and dump are disabled. A migration threshold of 90,80 is indicated. The storage group VIO is for virtual I/O with a maximum size of 1024 bytes, having a unit name of 3380 and identifies the same system as identified in the other three storage groups.

Figure 3:
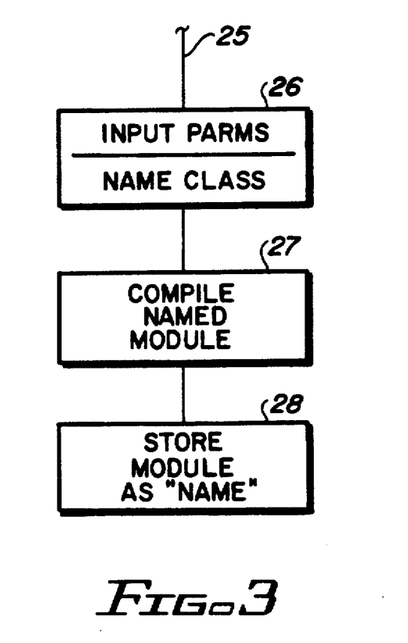
FIG. 3 is a simplified flowchart of machine effected operations which compile automatic class selection routines for the classes and groups defined by the FIG. 2 illustrated machine operations.

FIG. 3 illustrates steps for defining ACS routines which will be used by the FIG. 1 illustrated data processing system to select the FIG. 2 defined classes for data sets to be managed. Referring next to FIG. 3, numeral 25 indicates beginning of a session for creating or modifying ACS routines as by selecting 7 on the ISMF menu above. At step 26 the operator at terminal 13 inputs the data for the ACS routine to be generated. The ACS routine being created is assigned a name. Upon completion of the data inputs, the host processor 10 to which terminal 13 is attached, verifies, in step 27, the just entered data and compiles the generated ACS routine into executable code in a usual manner. Exemplary source code listings for automatic class selection (ACS) generated in step 26 for the defined classes are set forth below. At step 28 the executable modules are retentively stored in the data processing system. The program which manages the peripheral data hierarchy, such as IBM program DFP (Data Facility Product) then invokes the compiled module, one for each class (data, storage, management) and one for the storage group to automatically select classes for each data set as described later with respect to FIG. 7.

The source code for the compiled class selection modules generated in steps 26-28, are set forth below. Each time, an additional class or group is created in any of the steps 15-18, the automatic class selection module listings are changed to include the new definitions. Such programming modifications are well known and not detailed here.

In the listings below, /* indicates a comment which describes the immediately ensuing described machine operations. The symbol | indicates logic OR, && indicates a logic AND, NOT= indicates a test of not equal while = in a function creating step indicates the left hand operator is made equal to the right hand operator while in a WHEN step indicates equality as a program test step parameter. The parenthesis indicate grouping of logic operators, as is well known. The listings are based upon output expected from ISMF; the listings are simplified from the form outputted by ISMF.

---

DATA CLASS ACS ROUTINE

PROCEDURE 1 DATACLAS - ROUTINE TO SELECT A DATA CLASS

```
/* DEFINE RECOGNIZABLE LOW LEVEL DATA SET NAME QUALIFIERS */
FILTLIST DATAF     INCLUDE('DATA','FDATA')
FILTLIST DATAV     INCLUDE('TEXT','VDATA')
FILTLIST SRCF      INCLUDE('COB*','FOR*','JCL')
FILTLIST SRCV      INCLUDE('PLI','PL1','SCRIPT','CLIST')
FILTLIST OBJ       INCLUDE('SYSGO','SYSLIN','OBJ*')
FILTLIST LOAD      INCLUDE('RESLIB','PGMLIB','LOAD*')
FILTLIST LIST      INCLUDE('SYSOUT','LIST*','OUTLIST')
/* COMMENT: If the allocation request specifies a data class,
allow it to be used, else, select a data class based upon the low
level data set name qualifier. */
IF &DATACLAS= '' THEN
    SELECT (&LLQ)
        WHEN (&DATAF)      SET &DATACLAS = 'DATAF'
        WHEN (&DATAV)      SET &DATACLAS = 'DATAV'
        WHEN (&SRCF)       SET &DATACLAS = 'SRCFLIB'
        WHEN (&OBJ)        SET &DATACLAS = 'DATAF'
        WHEN (&SRCV)       SET &DATACLAS = 'SRCVLIB'
        WHEN (&LOAD)       SET &DATACLAS = 'LOADLIB'
        WHEN (&LIST)       SET &DATACLAS = 'LISTING'
        WHEN ('ENTRY')     SET &DATACLAS = 'ENTRY'
        WHEN ('KEYED')     SET &DATACLAS = 'KEYED'
        WHEN ('DIRECT')    SET &DATACLAS = 'DIRECT'
        WHEN ('LINEAR)     SET &DATACLAS = 'LINEAR'
    END
END
```

---

The above source listing shows a way of machine effected data class selection of the data classes set forth in the table of data classes (DATACLAS).

The step 16 defined storage classes each specify their respective set of storage services in device independent terms. Such specified services are matched with parameters in the allocation request to select a storage class. This selection is independent of the selection of a data or management class. Each storage class specifies random, sequential or direct access specifications, what guaranteed data storage space, if any, is to be provided in logical capacity (data storage space is allocated for storing data sets before a storage access request for storage of data is made). Note that the services are expressed in terms independent of any device capabilities—all specifications are still at a logical level.

If a data class is selected and no storage class is selected for a data set, then that data set is not system managed. The preferred selection of storage class is by examining the DSNAME (data set name) and its qualifiers.

The source code listing for a program module generated in steps 25 through 28 for automatically selecting a STORCLAS is given below.

---

STORAGE CLASS ACS ROUTINE

PROCEDURE 1 STORCLAS - ROUTINE TO SELECT A STORAGE CLASS

```
/*DEFINE DASD UNIT NAMES */
```

STORAGE CLASS ACS ROUTINE

PROCEDURE 1 STORCLAS - ROUTINE TO SELECT A STORAGE CLASS

```
FILTLIST DASD_UNITS INCLUDE('2305','3330','3340','3350','3375',
'3380','SYSDA','SYSALLDA','')
/*DEFINE TAPE UNIT NAMES */
FILTLIST TAPE_UNITS INCLUDE(TAPE*,T3420,T3480*,'3420','3480')
/*DEFINE NON SMS-MANAGED SYSTEM DATA SETS SUCH THAT ONLY SYSTEM
/*DATA SETS IN THE EXCLUDE LIST ARE ELIGIBLE TO BE SMS-MANAGED
FILTLIST SYSDSET      INCLUDE (SYS%.**)
                      EXCLUDE (SYS%.LIST.THAT.CAN.BE.SMS.MANAG-
                      ED)
/*DEFINE DATABASE 2 TABLE SPACE DATA SETS FILTLIST DB2 */
INCLUDE(*.DSNDB*.*.*.I00001.A*)
/*DEFINE DATA BASE LOW LEVEL QUALIFIER NAMES */
FILTLIST DBDSET       INCLUDE (DB*,'DATABASE',*DB)
SELECT
/* EXCLUDE NON DASD AND NON TAPE ALLOCATIONS */
WHEN (&UNIT NOT = &DASD_UNITS && &UNIT NOT = &TAPE_UNITS)
    SET &STORCLAS = ''
/* EXCLUDE SYSTEM DATA SETS THAT SHOULD NOT BE SMS-MANAGED */
WHEN (&DSN = &SYSDSET)
    SET &STORCLAS = ''
/* EXCLUDE TAPE ALLOCATIONS WITHOUT A DATA CLASS */
WHEN (&UNIT = &TAPE_UNITS && &DATACLAS = '')
    SET &STORCLAS = ''
/* EXCLUDE DFHSM RECALLS AND RECOVERIES FROM PROCESSING IF */
/*STORAGE CLASS IS ALREADY ASSIGNED TO THE DATA SET */
WHEN ((&ACSENVIR = 'RECALL' | &ACSENVIR = 'RECOVER') && &STORCLAS
NOT = '')
    SET &STORCLAS = &STORCLAS
/* ALLOW SYSTEM ADMINISTRATORS AND SYSTEM PROGRAMMERS */
/* TO CREATE NON-SMS MANAGED DATA SETS */
WHEN ((&GROUP = 'SYS' | &GROUP = 'SYSADMIN' = 'SYSADMIN') &&
&STORCLAS = 'NONSMS')
    SET &STORCLAS = ''
/* ALLOW SYSTEM ADMINISTRATORS AND SYSTEM PROGRAMMERS */
*/ TO SELECT A STORAGE CLASS OF CHOICE */
WHEN ((&GROUP = 'SYS' | &GROUP = 'SYSADMIN') && &STORCLAS NOT = '')
    SET &STORCLAS = &STORCLAS
/* ALLOW DATA BASE ADMINISTRATORS TO SELECT */
/* A DATA BASE STORAGE CLASS OF CHOICE */
WHEN (&GROUP = 'DBA' && &STORCLAS = DB* )
    SET &STORCLAS = 'DBBASE'
/* ASSIGN DATA BASE DATA SETS BASED ON DATA SET NAME */
WHEN (&LLQ = &DBDSET | &DSN = &DB2)
    SET &STORCLAS = 'DBBASE'
/* ASSIGN ALL OTHER DATA SETS TO THE BASE STORAGE CLASS */
OTHERWISE SET &STORCLAS = 'BASE'
    END
END
```

The source code listing generated by steps 25-28 for effecting automatic selection of a management class in the data storage hierarchy in accordance with the above-defined management classes is set forth below.

MANAGEMENT CLASS ACS ROUTINE

PROCEDURE 1 MGMTCLAS      ROUTINE TO SELECT MANAGEMENT CLASS

```
/* DEFINE SHORT LIFE DATA SET LOW LEVEL QUALIFIER (LLQ) */
FILTLIST LISTING INCLUDE('SYSOUT',LIST*,'OUTLIST')
/* DEFINE NO MIGRATION DATA SET HIGH LEVEL QUALIFIER (HLQ) */
FILTLIST NOMIG         INCLUDE(SYS%.**)
/* DEFINE DATABASE 2 TABLE SPACE DATA SET NAME FILTER */
FILTLIST DB2           INCLUDE(*.DSNDB*.*.*.I0001.A*)
/* DEFINE SOURCE DATA SETS FOR EXTRA BACKUP */
FILTLIST SOURCE        INCLUDE('ASM',COB*,FOR*,'CNTL','JCL',
                       'PLI','PL1','SCRIPT','CLIST','C')
SELECT
/* EXCLUDE DATA SET RECALL AND RECOVER FROM */
/* PROCESSING IF MANAGEMENT CLASS IS ALREADY ASSIGNED */
WHEN ((&ACSENVIR = 'RECALL' | &ACSENVIR = 'RECOVER') && &MGMTCLAS
    NOT = '')
    SET &MGMTCLAS = &MGMTCLAS
/* ALLOW SYSTEM ADMINISTRATOR AND SYSTEM PROGRAMMERS */
/* TO SELECT A MANAGEMENT CLASS OF CHOICE */
WHEN ((&GROUP = 'SYSADMIN' | &GROUP = 'SYS') && &MGMTCLAS
NOT = '')
    SET &MGMTCLAS = &MGMTCLAS
```

-continued

| MANAGEMENT CLASS ACS ROUTINE |
| --- |
| PROCEDURE 1 MGMTCLAS     ROUTINE TO SELECT MANAGEMENT CLASS |
| ```
/* ALLOW DATA BASE ADMINISTRATORS TO SELECT */
/* A DATA BASE MANAGEMENT CLASS OF CHOICE */
WHEN (&GROUP = 'DBA' && &MGMTCLAS = DB*)
        SET &MGMTCLAS = &MGMTCLAS
/* ASSIGN NON MIGRATABLE MANAGEMENT CLASS BASED ON NAME */
WHEN (&DSN = &NOMIG)
        SET &MGMTCLAS = 'NOMIG'
/* ASSIGN DATA BASE 2 DATA SETS BY NAME */
WHEN (&DSN = &DB2)
        SET &MGMTCLAS = 'DBMIG'
/* ASSIGN SHORT LIFE DATA SETS BASED ON LLQ */
WHEN (&LLQ = &LISTING)
        SET &MGMTCLAS = 'INTERIM'
/* ASSIGN GENERATION DATA GROUPS (GDG) */
WHEN (&DSTYPE = 'GDG'
        SET &MGMTCLAS = 'GDG'
/* ASSIGN SOURCE DATA SETS BASED ON LLQ */
WHEN (&LLQ = &SOURCE)
        SET &MGMTCLAS = 'EXTRABAK'
/* ASSIGN ALL OTHER DATA SETS */
/* TO THE STANDARD MANAGEMENT CLASS */
OTHERWISE
        SET &MGMTCLAS = 'STANDARD'
        END
END
``` |

A source code listing created by steps 25-28 for effecting automatic selection of a storage group in the data storage hierarchy in accordance with the above-defined storage groups and selected classes is set forth below:

| STORAGE GROUP ACS ROUTINE |
| --- |
| PROCEDURE 1 STORGRP - SELECT A STORAGE GROUP |
| ```
SELECT
/* ASSIGN DATA BASES BASED ON STORAGE CLASS */
WHEN (&STORCLAS = DB* )
    SET &STORGRP = 'DATABASE'
/* ASSIGN LARGE DATA SETS BASED ON MAXIMUM SIZE OF EACH */
/* THE TERM LARGE HAS TO BE EMPIRICALLY DETERMINED */
/* BEFORE THIS ROUTINE CAN BE RUN */
WHEN (&MAXSIZE > 9999999KB)
    SET &STORGRP = 'LARGE'
/* ASSIGN TEMPORARY DATA SETS TO VIO LAND */
/* PRIMARY STORAGE GROUPS (SMS DETERMINES VIO */
/* CANDIDACY BASED ON VIO MAXSIZE IN VIO STORAGE GROUP) */
WHEN (&DSTYPE = 'TEMP')
    SET &STORGRP = 'VIO','PRIMARY'
/* ASSIGN ALL OTHER DATA SETS TO PRIMARY STORAGE GROUP */
OTHERWISE
    SET &STORGRP = 'PRIMARY'
    END
END
``` |

Figure 4:
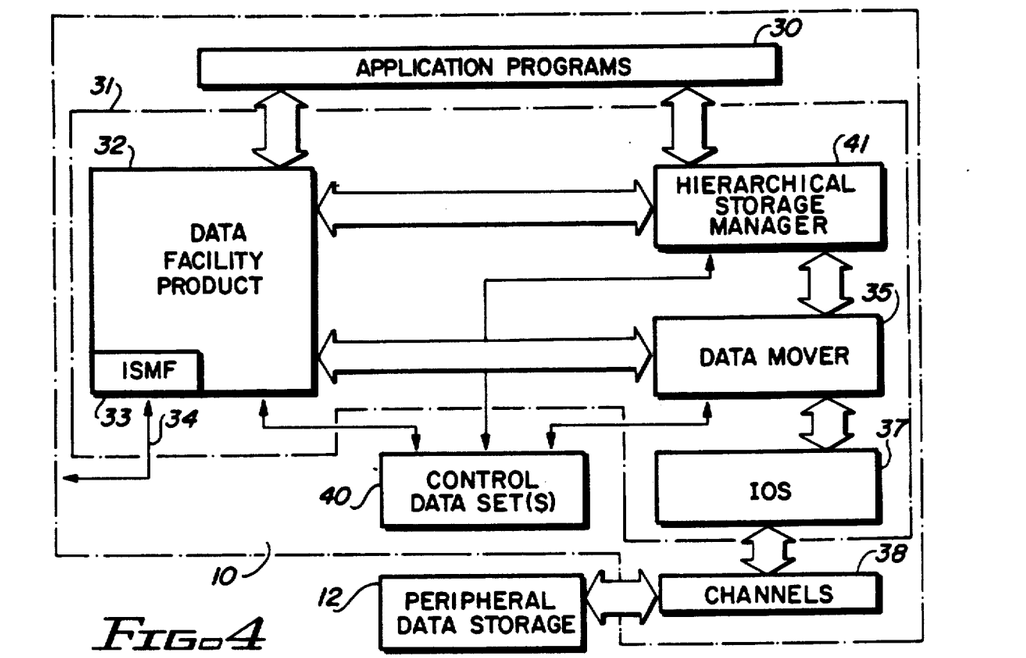
FIG. 4 is a simplified block diagram showing the relationships of application programs to peripheral data storage when practicing the present invention in the FIG. 1 illustrated system.
Figure 6:
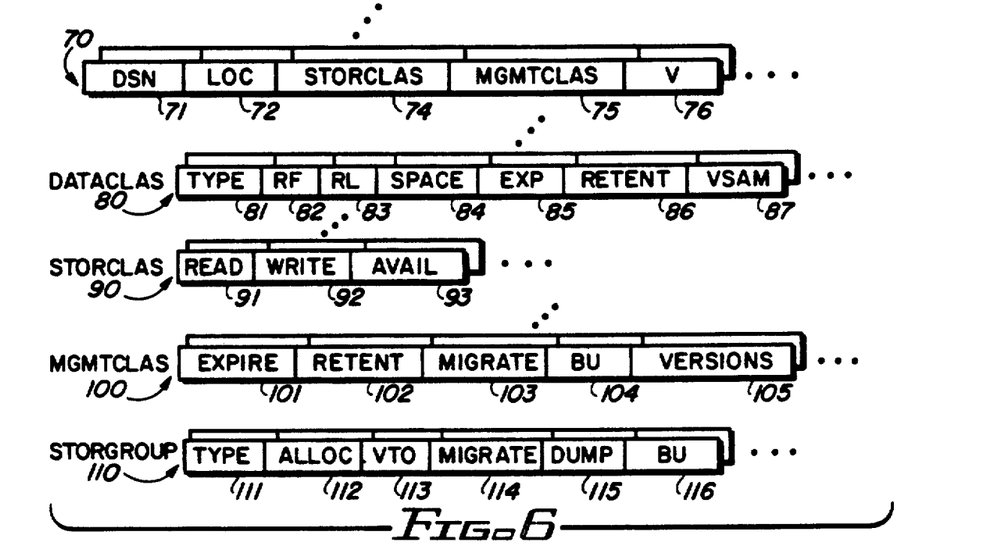
FIG. 6 is a simplified showing of data structures usable with the FIG. 4 illustrated system.

The logical relationships of application programming to the controls effected by the present invention are illustrated in simplified form in FIG. 4. All items shown in FIG. 4 excepting peripheral data storage 12 are in a host processor 10. A large plurality of application programs 30 execute on the host processor 10. Software connections to the peripheral control programs 31 are provided in the usual manner. Data Facility Product (DFP) 32 includes programming that implements the present invention. A portion of DFP 32 is ISMF 33, a terminal support programs referred to above for operating with terminal 13. Double-headed arrow 34 represents the connection to one or more terminals 13. Data mover program 35 actually causes data movement between main memory (not shown) of the most processor and peripheral data storage 12. IBM program DFDSS is such a data mover program. Data mover 35 operates with IOS (input output system) 37, a part of the operating system of host processor 10, to effect transfer of data between the main memory (not shown) of the host processor 10 and the peripheral data storage 12 via input output channels 38. Coordination of such peripheral operations is via control data sets (CDS) 40; most of which are known, new data structures for understanding the present invention are shown in FIG. 6. Operating along side of DFP 32 is DFHSM 41, a hierarchical storage manager. DFHSM 41 provides for migration, recall, backup, etc of volumes as heretofore operated and now acts at the data set and data base level using management class controls.

Figure 5:
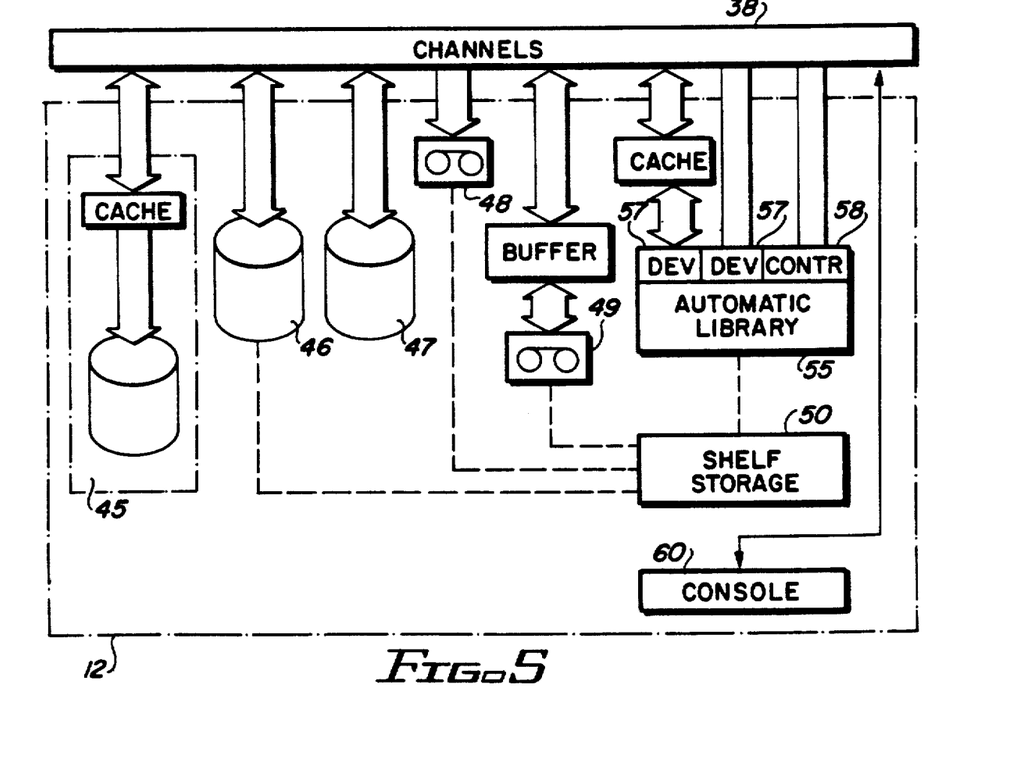
FIG. 5 is a simplified block diagram of a peripheral data storage system for which the present invention is advantageously applied.

FIG. 5 is a simplified diagram of a peripheral data storage system 12 attached to channels 38. A primary or level 0 of hierarchical peripheral data storage includes cached DASD sub-system(s) 45 while level one of the hierarchy includes medium-performance DASD(s) 46. High performance DASD(s) 47 may be a part of the primary level. Level two of the hierarchy can include directly connected tape subsystem(s) 48 or buffered tape subsystem(s) 49. A level three of the hierarchy includes shelf storage unit(s) 50. Operators hand carry tape reels (volumes) between storage unit(s) 50 and tape drives of tape subsystem(s) 48 and 49. An automatic data media library (tape o disk) 55 may also be included in peripheral data storage 12. Library 55 typically includes a media handling library portion 56 and a plurality of recorders/readers (tape or disk) DEV 57 and a library control CONTR 58. Shelf storage unit(s) 50 are also operatively associated with library 55. A storage console 60 is the terminal used to communicate with host processor 10 for manual aspects of the peripheral data storage 12 and can be used as the terminal 13 for ISMF. Library 55 can be a lower (higher numbered) level the data storage hierarchy, the level being a matter of design choice.

FIG. 6 illustrates, in simplified form, data structures useable when practicing the present invention in the described environment. The term volume includes a logical volume (separately addressable storage space) or a physical volume (tape reel, DASD spindle, set of DASD cylinders, etc). The logical volumes are address spaces in one or more physical volumes. Each volume addressable in peripheral data storage 12 has a volume directory identified as volume table of contents (VTOC) (this includes the TTOC or tape table of contents and VVDS (VSAM volume data set). Directory 70, which can be a data set includes DSN 71 which stores the data set or data base name, LOC 72 which indicates the storage location at which DSN is stored, STORCLAS 74 which names the storage class to which DSN is a member, and MGMTCLAS 75 which names the management class to which DSN belongs. Data class is not included since the data class does not define parameters directly usable by peripheral data storage 12; rather the data class defines DSN in terms of data set (data base) parameters—not storage parameters. Field V 75 indicates the volume serial number or name VOLSER. The ellipsis indicates that each entry may contain additional fields not pertinent to an understanding of the present invention.

The data class definition can be stored in the data processing installations catalog, in other system accessible data structures or as a separate control block. Each data class (DATACLAS) entry 80 includes type field 81 indicating type of data, RF field 82 indicating record format, RL field 83 indicating record length, space field 84 indicating primary. secondary and directory space requirements, EXP field 85 indicating expiration period (elapsed time since generation of the data), RETENT field 86 indicating retention requirements for primary storage, VSAM field 87 indicating VSAM record parameters. Each storage class entry STORCLAS 90 includes read field 91 and write field 92 respectively indicating read and write access time requirements, AVAIL field 93 indicating availability requirements, ALLOC size field 94 indicating the allocation size required for member data sets or data bases and other fields as may be required or desired. Management class entry MGMTCLAS 100 includes EXPIRE field 101 for indicating expiration period (elapsed time rather than a calendar date), RETENT field 102 indicating the retention period in primary storage, MIGRATE yield 103 indicating migration requirements such as days since last access BU field 104 indicating backup requirements, versions field 105 indicating a number of versions required to be kept, and other fields indicating yet other requirements of a given management class. Storage group entry STORGRP 110 includes TYPE field 111 indicating type of group (pool, etc), ALLOC 112 indicating allocation sizes, VIO field 113 indicating requirements for volatile IO (VIO) data sets, MIGRATE field 114 indicating migrations properties (automatic, none, etc), DUMP field 115 indicating dump parameters (permitted, etc), BU field 116 indicating back up parameters, and other fields indicating yet other parameters. It is seen that the data class entry 80 does not specify all of the parameters and requirements set forth in the storage and management classes and in the storage group. This means that the application programmer or user does not get involved with such details—the user only has to characterize the data set which can be implicit by data set name (DSN).

Addressing of the entries illustrated in FIG. 6 can use any conventional addressing scheme employed for table addressing. Each of the classes and the group definitions can be in separate tables (no limitation thereto intended) with the entry offset indicating which class or group is being defined. An additional field can be added to each entry with the name of the class or group for relational addressing.

Figure 7:
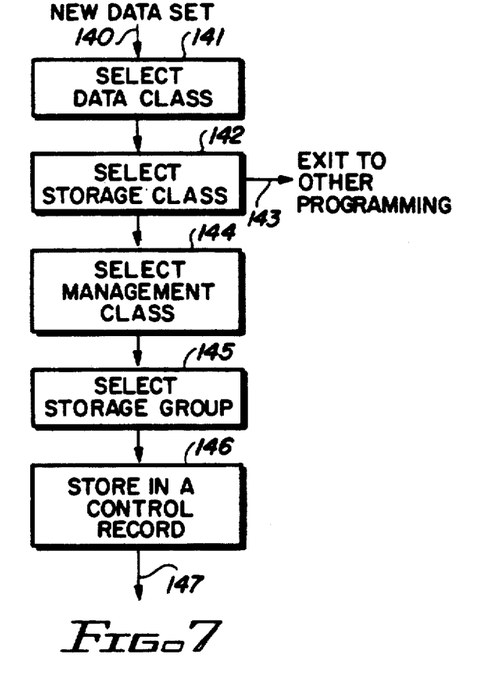
FIG. 7 is a simplified flow chart of machine operations for selecting classes for a data set when practicing the present invention.

FIG. 7 is a flowchart illustrating the automatic selection of classes (ACS) used in accordance with the present invention and occurring between the declaration of a data set or data base and a request for allocation of data space in system 12 for such data set or data base. Such automatic selection of classes for each data set always includes a data class DATACLAS selection. If only a DATACLAS and no storage and management classes nor storage class, then the data set is not system managed. The data set is system managed when the storage class is selected. These class selections for a data set are preferably performed within the computer without operator involvement. It is to be understood that any usual programming for sequencing the illustrated class selection routines may be employed, therefore those details not necessary for an understanding of the present invention are omitted. The actual classes selected for the data set are not only dependent on the respective class definitions but also the programming logic of selection. In the illustrated ACS routines, a simple listing provides a priority of selection of the first listed class in each set of classes as well as the order of class selection. Best fit or other algorithms may also be employed for obtaining diverse results.

The data-set class selection request is received from a user program via DFP processes (not shown nor described) at line 140. This request can be instituted by a declaration of a data set or data base into the system. Herein, the term data set is intended to include either a data set, data file or data base as those terms are used. The first step 141 is a machine-implemented selection of a data class using the ACS program listed in the table entitled "DATA CLASS ACS ROUTINE", supra. For data class selection. this ACS routine compares the information in DATACLAS 80 with the parameters (not shown) received with the data set, such as in the data set name (DSN). A predetermined comparison of the DATACLAS information and the received parameters, such as predetermined identities (no limitation thereto intended) causes the DATA CLASS ACS ROUTINE to select one of the above enumerated DATACLAS's. Upon selection of a data class, the second step 142 selects a storage class. The program for the machine-implemented selection is shown in the table entitled "STORAGE CLASS ACS ROUTINE", supra. One of the options in the storage class selection machine process, as indicated by arrow 143, is to assign the allocation to a "non-SMS managed" portion of the data processing system. That is, the storage management system (SMS) which uses the storage and management classes is not to manage the data set which is the subject of the current class selection request. This exclusion process is at the comment "define non SMS-managed data sets" within the listing STORAGE CLASS ACS ROUTINE. In the example, the system data sets (SYS.**) having a DSN including the exclusion parameter for being directed away from the controls of the present invention is based upon parsing the DSN. Therefore, data classes are selectable for data sets to be managed by operation of the present invention or with other types of controls.

Assuming that a storage class was selected for the data set, then at third machine-executed step 144, a management class is machine selected using the program illustrated in table "MANAGEMENT CLASS ACS ROUTINE". The parameters in MGMTCLAS 100 are compared with the received data set parameters for determining a best comparison which indicates which of the management classes listed above is selected for the data set. The machine selection of a management class completes the logical machine-executed class selection process all of which is in preparation for 15 storage is accessed using the devices assigned to a storage group. It is to be noted that classes denote storage management requirements; therefore the main usage of the class definitions is in the management of the data space for maximizing its utility while establishing implicit allocation processing based upon the data class definition. As an example, the IBM product DFHSM refers to the management class indicated in field MGMTCLAS 75 for ascertaining which of its current migration, backup, deletion and dump machine-effected operations and when such operations are to be employed on the system managed data sets which are members of the various management classes throughout the "lives" of such data sets. The IBM product DFP provides allocation of data space as set forth herein. It is to be understood that the data structures described herein are expandable and that the implicit and user independent data and data space management can expand along with the changes in the data structures and can expand in finding additional uses for the current data structures.

The practice of the present invention simplifies JCL statements by reducing the amount of information required for the host processor to successfully respond to JCL statements. In the prior art, a JCL statement could look like:

```
//DDNAME DD  DSN = X11.DATA.TEXT,DISP = (NEW,CATLG),
//          DCB = (LRECL = 80,BLKSIZE = 800,RECFM = FB),
//          UNIT = SYSDA,VOL = SER = PRMO32,
//          SPACE = (TRK,(100,100))
``` selection of a storage group of volumes in which the allocation of space for the data set is to occur. It is parenthetically noted that data set members of one data class can have or be assigned different storage and management classes, that data sets assigned or with different data classes can be members of the same storage class but members of different management classes.

Figure 8:
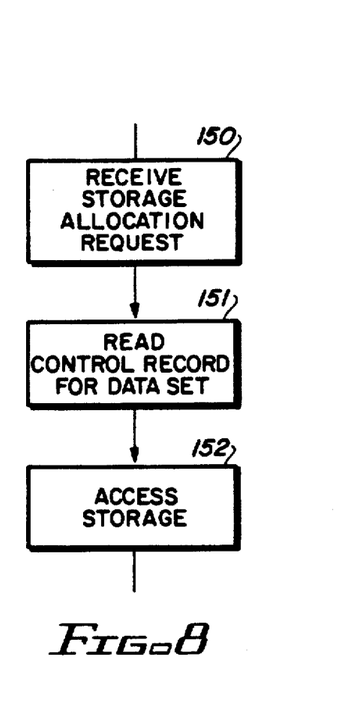
FIG. 8 is a simplified flow chart of machine operations for allocating data storage space in one or more peripheral data storage devices after the class selections for data sets as shown in FIG. 7.

The fourth and final selection is the storage group by machine-executed step 145 from which storage space will be allocated to the data set. This machine-selection is illustrated in the table entitled "STORAGE GROUP ACS ROUTINE". Upon completion of the class and group selections, at machine-executed step 146 the identifications of the selected classes and the data set are retentively stored within the FIG. 1 illustrated data processing system as a control record, which is an entry in directory 70 for later use by an allocation program (FIG. 8). It is expected in the present illustrated embodiment that one storage group will be describing storage parameters for data sets having diverse data classes, storage classes and management classes. Arrow 147 indicates the program execution proceeds to other programming not pertinent to the present description. At this time the data processing system is primed for receiving an allocation request(s) for the data set and making the allocation using SMS management.

FIG. 8 illustrates how DFP responds to a received allocation request when the access request relates to the SMS managed data. The allocation request is received from a user program at step 150. At step 151 the pertinent control record (entry in directory 70) is read to determine if a storage class was selected for the data set. If a storage class was not selected (STORCLAS 70 field of the directory 70 entry is null), then the access request is handled as in the prior art, i.e. it is not a system managed data set. If a storage class was selected, then at step When the present invention is practiced, the JCL statement above could be:

```
//DDNAME DD  DSN = X11.DATA.TEXT,DISP = (NEW,
                KEEP)
```

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method for enabling the managing of data storage space for allocating such space for data to be stored in a data storage system and for enabling management of such data stored in said data storage system;

the machine-executed steps of:

storing in said data storage system storage machine-sensible indicia representing a plurality of storage class definitions, each of said storage class definitions including predetermined ones of the machine-sensible indicia representing data storage performance and availability parameters;

storing in said data storage system management machine-sensible indicia representing a plurality of management class definitions with ones of the management machine-sensible indicia representing each management class definition including ones of the management machine-sensible indicia respectively indicating management parameters for handling units of data stored in the data storage system such as life cycle processing which are independent of said performance and availability parameters;

storing in said data storage system group machine-sensible-indicia representing a storage group definition each of which includes group machine-sensible indicia representing lists a plurality of data storing volume including operations to be performed on data stored in volumes which are in the respective storage groups;

storing in said data storage system select machine-sensible indicia representing a plurality of automatic class selection routines for respectively selecting a one of said storage and management classes and one of the storage groups for each separate unit of data to be stored in the data storage system wherein each of the automatic class selection routines access the respective machine-sensible indicia represented definitions stored in the data storage system during each said class selection.

2. In the machine-effected method set forth in claim 1, including the machine-effected steps of:

establishing predetermined user data set machine-sensible indications for a unit of data to be stored in the data storage system;

automatically comparing said predetermined user data st machine-sensible indications of the unit of data with said storage class definitions and automatically selecting a one of said storage classes independently of said management class definitions; and after automatically selecting a one each of said storage and management classes, automatically selecting a one of the storage groups independently of the storage class selection.

3. In the machine-effected method set forth in claim 2, including the machine-executed steps of:

after automatically selecting said one of the storage machine-sensible indicia represented storage groups, automatically allocating data storage space on at least one of the volumes which is a member of the selected storage group, such automatic allocation being substantially independent of the automatic class selections; and automatically storing said unit of data in said selected volume.

4. In the machine-effected method set forth in claim 2, including the machine-executed steps of:

storing in said data storage system machine-sensible indicia representing a plurality of data class definitions each of said class definitions defining respective diverse definitions of data characteristics which are independent of the definitions in said storage and management class definitions; and automatically managing the life cycle of the stored data using the parameters of the management class independently of said predetermined user data set indications.

5. In the machine-effected method set forth in claim 4, including the machine-executed steps of:

automatically managing some of said data using said storage and management classes and manually managing other of said data using controls not including said storage and management classes wherein human users of the data participate in the management of said other data.

6. In the machine-effected method set forth in claim 5, further including the machine-executed steps of:

automatically managing the life cycle of each unit of data stored in the data storage system using only the respective management class selected for the units of data.

7. In the machine-effected method set forth in claim 5, further including the machine-executed step of:

storing in said data storage system machine-sensible indicia representing a control directory for all units of data assigned to said data, storage and management classes and storage groups and only including identification of said automatically selected storage and management classes and the volume(s) of data allocated for storing the respective units of data and an identification of the respective unit of data.

8. In apparatus for enabling automatic management of a data storage system and units of data stored therein, including, in combination:

first means indicating a set of data classes each having diverse identifications of data unit properties;

second means indicating a set of storage classes each having diverse identifications of storage performance and availability parameters;

third means indicating a set of management classes each having diverse data unit life cycle management rules;

fourth means indicating a set storage groups having a list of data storing volumes and a set of parameters for managing the data storing volumes, including data backup operations;

fifth means for receiving from a user a definition of a data unit which includes data parameters;

sixth means coupled to said first through fifth means for selecting one of the classes from said first through third means for the data unit definition and a one of the storage groups having a volume from which data storing space for the data unit may be allocated in the future; and seventh means coupled to the sixth means for storing the selections along with the identification of the data unit.

9. In apparatus for storing data units, each data unit having a name, externally to a host processor, including, in combination:

class definition means for defining a plurality of classes of definitions in sets of such classes with each set identifying independent and diverse parameters relating to the storage of the data units in the apparatus;

class selection means operatively associated with the class definition means for selecting a one of the defined classes from each set of such classes for each data unit to be stored in the apparatus;

storage group means for defining a plurality of groups of volumes each of the groups being a storage group;

said class selection means operatively associated with the storage group means for selecting a one of the storage groups after said class selection which storage group best meets the parameters set forth in the selected classes and having means for storing the selections along with the data unit name in said apparatus; and operating means coupled to the stored selections for receiving the data units and operating the apparatus in accordance with the stored parameters in the respective selected classes and storage groups.

10. In the apparatus set forth in claim 9, further including, in combination:

all of the means being programmed defined with said class selection and operating means being programs executable in the host processor and class definition means and said storage group means being control data structures; and terminal means connected to the apparatus and being operatively associable with all of the means aforementioned for altering the data structures and programs such that the automatic management of the apparatus is manually alterable via said terminal.

* * * * *